United States Patent [19]

Falk et al.

[11] Patent Number: 4,485,219

[45] Date of Patent: Nov. 27, 1984

[54] PHENYLENE ETHER COPOLYMER AROMATIC POLYCARBONATE BLENDS

[75] Inventors: John C. Falk, Northbrook; Klementina F. Khait, Skokie, both of Ill.

[73] Assignee: Borg-Warner Chemicals, Inc., Parkersburg, W. Va.

[21] Appl. No.: 556,889

[22] Filed: Dec. 1, 1983

[51] Int. Cl.$^3$ ............................................. C08L 71/04
[52] U.S. Cl. .................................... 525/394; 525/462; 525/905
[58] Field of Search ...................... 525/394, 905, 462; 528/196

[56] References Cited

U.S. PATENT DOCUMENTS

| | | |
|---|---|---|
| 3,134,753 | 5/1964 | Kwiatek ................................ 260/47 |
| 3,221,080 | 11/1965 | Fox ..................................... 260/860 |
| 3,306,874 | 2/1967 | Hay ..................................... 260/47 |
| 3,356,761 | 12/1967 | Fox ..................................... 260/874 |
| 3,361,851 | 1/1968 | Gowan ................................ 260/897 |
| 3,383,435 | 5/1968 | Cizek .................................. 260/874 |
| 3,879,347 | 4/1975 | Serini et al. .................... 260/47 XA |
| 3,879,348 | 4/1975 | Serini et al. .................... 260/47 XA |
| 3,933,941 | 1/1976 | Yonemitsu et al. ................. 260/873 |
| 4,011,200 | 3/1977 | Yonemitsu et al. ............ 260/47 ET |
| 4,038,343 | 7/1977 | Yonemitsu et al. ................. 260/874 |
| 4,374,233 | 2/1983 | Loucks et al. ..................... 525/394 |
| 4,377,662 | 3/1983 | Loucks ............................... 525/394 |

*Primary Examiner*—Theodore E. Pertilla
*Attorney, Agent, or Firm*—Richard J. Schlott

[57] ABSTRACT

Blends comprising an aromatic polycarbonate and a phenylene ether copolymer resin exhibiting good toughness and improved high temperature end-use performance as measured by heat distortion temperature.

8 Claims, No Drawings

PHENYLENE ETHER COPOLYMER AROMATIC POLYCARBONATE BLENDS

BACKGROUND OF THE INVENTION

Polyphenylene ether (PPE) resins and particularly PPO, or poly(2,6-dimethyl-1,4-phenylene ether), have long been known as high temperature thermoplastics. These resins are typically prepared by the oxidative coupling of a monohydric phenol such as 2,6-dimethyl phenol, as taught for example in U.S. Pat. Nos. 3,134,753 and 3,306,874. PPE resins soften or melt only at very high temperatures, normally well above 500° F., which may exceed the upper limit of thermal stability for such materials. The resins also exhibit a very high melt viscosity, and are very difficult to melt process in conventional processing equipment without substantial thermal degradation. Commonly, the resins are blended with lower melt temperature resins to improve their melt processability and to achieve commercially acceptable molding characteristics. For example, polyphenylene ether resins may be blended with styrenic resins as is disclosed in U.S. Pat. Nos. 3,356,761 and 3,383,435 or with polyolefins such as polyethylene as described in U.S. Pat. No. 3,361,851 to achieve improved processability. Blends of poly-2,6-disubstituted phenylene ethers with aromatic polycarbonate resins are somewhat more processable than PPO alone and are craze resistant, as is disclosed in U.S. Pat. No. 3,221,080. These latter blends are generally brittle and require the addition of a third component such as high impact polystyrene to further improve the molding characteristics and to achieve mechanical properties adequate for use in molding applications, as shown in U.S. Pat. No. 3,933,941.

More recently, in U.S. Pat. No. 4,038,543, there were disclosed phenylene ether copolymer resins (PEC) having improved thermal resistance, high temperature oxidative stability and resistance to heat aging. These resins, copolymers of 2,6-dialkyl phenols and 2,3,6-trialkyl phenols containing up to 50 wt% of the trialkyl monomer component, are more stable at the melt processing temperature, but exhibit a high melt viscosity and are also difficult to melt process alone. Blending these copolymers with other resins such as styrenic polymers is therefore necessary to achieve adequate processability and a useful balance of mechanical properties for commercial molding applications.

Although blends of polyphenylene ether resins or phenylene ether copolymer resins with styrenic resins achieves an improvement in processability and when further formulated produces molding resins with a useful balance of mechanical properties, the blends generally exhibit a significantly lowered heat distortion temperature, and the upper use temperature of these blends is considerably less than that of the phenylene ether resin alone. The market place continues to find need for processable thermoplastic molding resins with a good balance of mechanical properties and even higher end-use temperatures, demands which are not satisfactorily met by the presently available resin compositions.

SUMMARY OF THE INVENTION

This invention is a thermoplastic blend comprising a phenylene ether copolymer resin and an aromatic polycarbonate. The blends are melt processable, exhibiting excellent thermal resistance and stability at the melt processing temperature, together with good mechanical properties. The blends have a significantly improved upper use temperature limit as evidenced by a high heat distortion temperature and are useful in molding applications where good high temperature performance is needed.

DETAILED DESCRIPTION OF THE INVENTION

The compositions of this invention comprise from 5 to 95 wt% of a phenylene ether copolymer and from 95 to 5 wt% of an aromatic polycarbonate.

The phenylene ether copolymer resins useful for the purpose of this invention are, in general, copolymers of a 2,6-dialkyl phenol such as for example 2,6-dimethyl phenol, and a 2,3,6-trialkyl phenol such as for example 2,3,6-trimethyl phenol. The proportion of 2,3,6-trialkyl phenol will lie in the range of from about 2 to 50 wt% based on total phenylene ether copolymer. However, the preferred copolymers will comprise from about 2 to 20, more preferably from about 2 to about 10 wt% 2,3,6-trialkyl phenol and correspondingly from about 98 to about 80, more preferably from about 98 to about 90 wt% 2,6-dialkyl phenol. The synthesis of these resins from the corresponding phenols by an oxidative coupling process is well known and is well described and set forth in the art, for example in U.S. Pat. No. 4,011,200.

The aromatic polycarbonate resins useful in the practice of this invention are also well known in the art and include resins such as those set forth in U.S. Pat. Nos. 2,999,835, 3,879,347 and 3,879,348. In general, the polycarbonate resins may be described as being prepared by reacting a carbonate precursor such as phosgene with unhindered or hindered dihydric phenols, as well as mixtures thereof. The unhindered dihydric phenols may be more particularly described as bis(4-hydroxyphenyl)alkanes such as, for example 2,2-bis(4-hydroxyphenyl)propane (bisphenol A), 2,2-bis(4-hydroxyphenyl)butane (bisphenol B), 1,1-bis(4-hydroxyphenyl)cyclohexane (bisphenol C), bis(4-hydroxyphenyl)methane (bisphenol F) and the like, as well as mixtures thereof. The unhindered dihydric phenol carbonate resins are widely available commercially in a variety of extrusion and molding grades.

The hindered dihydric phenols include bis(3,5-dialkyl-4-hydroxyphenyl)alkanes such as for example 2,2-bis(3,5-dimethyl-4-hydroxyphenyl)propane, 2,2-bis(3,5-diethyl-4-hydroxyphenyl)propane, 2,2-bis(3,5-diisopropyl-4-hydroxyphenyl)propane and the like. The preparation of the corresponding carbonate homopolymers is disclosed in U.S. Pat. No. 3,879,348, while the copolymers are set forth in U.S. Pat. No. 3,879,347.

The blend compositions of this invention may be prepared by any of a variety of methods well known in the art. For example, the resins may be dissolved in suitable solvents, the resulting solutions mixed in the desired proportions, and the blend isolated by coagulation or by removing the solvent by evaporation or stripping. Alternatively, an intimate mixture of the powdered resins may be prepared by a dry-blending technique and then compression molded or thermally processed in a melt-mixing device such as a Banbury mixer, a heated roll mill or a single or twin-screw extruder to provide a resin blend which then may be chopped or ground into particles and fed to an injection molding machine.

The blends are useful as extrusion and molding resins. The blends may further comprise flame retardants, antioxidants, stabilizers, pigments, dyes, fillers, reinforcing fibers, plasticizers and processing aids as is well known in the resin molding art.

The blends of this invention will be better understood by consideration of the following examples. These examples are not offered in limitation of the invention but rather in illustration of the preferred embodiments.

EXAMPLES 1-10

In the following examples, blends of the indicated resins were prepared by mixing 4.35 wt% solutions of the respective resins in chloroform solvent, coagulating the blend with 10 volumes of methanol collecting the coagulated resin and drying at 100° for 16 to 24 hrs. The dried resin blends were then milled at 560° F. for 5 to 6 min. on a two-roll mill, cooled, diced and compression molded at 560° F. for 7 min. The blend compositions and their impact and heat distortion properties are summarized in Table I.

TABLE I

| Ex No | PEC (pbw) | PC (pbw) | HDT °C. | IMPACT notch | IMPACT unnotch |
|---|---|---|---|---|---|
| 1 | 100 | 0 | 195 | 1.2 | 49 |
| 2 | 90 | 10 | 193 | 1.1 | 45 |
| 3 | 80 | 20 | 190 | 0.5 | 7 |
| 4 | 75 | 25 | 184 | 0.7 | 15 |
| 5 | 70 | 30 | 184 | <0.5 | 9 |
| 6 | 60 | 40 | 156 | 0.8 | 4 |
| 7 | 50 | 50 | 146 | 1.0 | 6 |
| 8 | 30 | 70 | 142 | 1.0 | 16 |
| 9 | 10 | 90 | 140 | 7.8 | 25 |
| 10 | 0 | 100 | 139 | 18 | 39 |

Notes:
PEC = copolymer of 2,6-dimethylphenol (95%) and 2,3,6-trimethylphenol (5%).
PC = polycarbonate of 2,2-bis(4-hydroxyphenyl)propane, obtained as Lexan 105 from General Electric Co.
HDT = deflection temperature at 264 psi, ASTM-D668.
Impact = Izod impact, ft lbs/in notch, ASTM-D256A, unnotch values obtained on specimens without notch.

CONTROL EXAMPLES

In the following Control Examples A-D, blends of poly(2,6-dimethylphenylene ether)PPO and Lexan 105 polycarbonate were prepared for comparison purposes. The blending process and the molding procedures used were substantially identical to those employed in the preparation of the copolymer blends of Examples 1-10.

TABLE II

| Ex No | PPO pbw | PC pbw | HDT °C. | IMPACT notch | IMPACT unnotch |
|---|---|---|---|---|---|
| A | 100 | 0 | 191 | 0.8 | 37 |
| B | 90 | 10 | 186 | 0.6 | 31 |
| C | 80 | 20 | 186 | <0.5 | 5 |
| D | 70 | 30 | 169 | <0.5 | 5 |
| E | 50 | 50 | 138 | 0.7 | 12 |

Notes:
PPO = homopolymer of 2,6-dimethylphenol, obtained from Aldrich Chemical Co. (see notes, Table I)

It will be apparent from a comparison of Examples 2, 3, 5 and 7 of Table I with the corresponding Control Examples B-E, Table II, that PEC-polycarbonate blends exhibit substantially better impact properties and higher heat distortion values than the PPO-polycarbonate blends of the prior art. The surprising aspect of the PEC blends of this invention lies in the heat distortion temperature values and unnotched impact values for blends containing greater than 60 wt% PEC compared with those of the control (PPO) blends. As is well known in the art, many tough, rigid thermoplastic resins exhibit notch-sensitive impact charcteristics. Impact values for notched specimens of such materials are therefore not reflective of the true toughness of these materials. For the compositions of this invention, unnotched impact values demonstrate the remarkable toughness of copolymer blends containing moderate amounts of an aromatic polycarbonate. This characteristic toughness is also noted with blends containing only small amounts of the copolymer in blends with the aromatic polycarbonate, as shown in Examples 8 and 9 of Table I. In the mid-range compositions, however, the blends tend to be brittle as shown by Examples 6 and 7.

It will be recognized that processing conditions may have a significant effect on the impact properties of rigid thermoplastics. All compositions summarized in Table I and the Control Compositions of Table II were prepared and compression molded in the same way. When processed by alternative means, such as by melt-blending or injection molding the blends exhibit differences in impact properties. For example, when injection molded at 560° F., the 80/20 PEC/PC blend of this invention (Example 3, Table II) had a notched izod impact of 0.6 ft lbs/in., and an unnotched impact of 13.1 ft lbs/in. The Control Example C, of Table II, a 80/20 PPO/PC blend, had values of 0.6 ft lbs/in(notch) and 8.2 ft lbs/in(unnotch) when injection molded under the same conditions. The copolymer blend is again tougher than the corresponding Control (PPO) blend when both are injection molded. Similarly the composition of Example 3 had an unnotched impact of 35 lbs/in when melt-mixed in a Brabender mixing head and compression molded.

EXAMPLES 11-15 AND CONTROL EXAMPLES F-H

In the following Examples, a carbonate polymer of 2,2-bis(3,5-dimethyl-4-hydroxyphenyl)propane was prepared by interfacial polycondensation of the hindered dihydric phenol with phosgene according to the teachings of U.S. Pat. No. 3,879,348. The dry product polymer, having a weight ave. molecular weight of 44,000, was blended with phenylene ether copolymer (Examples 11-15) and with polyphenylene oxide (Control Examples F-H), by melt-mixing in a Banbury mixer at 560° F., then compression molded under the conditions described for Examples 1-10.

The physical properties of the blends and of the Control Blends are summarized on Tables III and IV, respectively.

TABLE III

| Ex No | PEC (pbw) | MPC (pbw) | HDT °C. | IMPACT notch | IMPACT unnotch |
|---|---|---|---|---|---|
| 11 | 90 | 10 | 193 | 1.0 | 22 |
| 12 | 70 | 30 | 189* | <0.6* | 5* |
| 13 | 50 | 50 | 185 | <0.5 | 4 |
| 14 | 10 | 90 | 178 | <0.5 | 2 |
| 15 | 0 | 100 | 181 | 0.5 | 4 |

Notes:
MPC = polycarbonate of 2,2-bis(3,5-dimethyl-4-hydroxyphenyl)propane (see notes, Table I)
*Specimen was solution-blended and compression molded as in Examples 1-10.

TABLE IV

| Ex No | PPO (pbw) | MPC (pbw) | HDT °C. | IMPACT notch | IMPACT unnotch |
|---|---|---|---|---|---|
| F | 90 | 10 | 190 | 0.7 | 3 |
| G | 50 | 50 | 188 | <0.5 | 1 |
| H | 10 | 90 | 179 | <0.5 | 0.8 |

Notes:
See notes to Tables I-III.

It will again be apparent from the data summarized in Table III that blends of PEC copolymer with an aromatic polycarbonate exhibit significantly better impact properties and higher test distortion properties than the blends with PPO. Again, the surprising aspect of the blends of this invention is reflected in the unnotched impact values for blends with greater than 50% PEC (Examples 11-13). The Control Blends, containing PPO, again are relatively brittle (Control Examples F-H).

This invention will thus be seen to be a blend comprising from 5 to 95 wt% of the carbonate polymer of a dihydric phenol and, correspondingly from 95 to 5 wt% of a polyphenylene ether copolymer comprising from 98 to 80 wt% 2,6-dialkylphenol and from 2 to 20 wt% 2,3,6-trialkylphenol. The preferred polyphenylene ether copolymer is a copolymer of from 98 to 90 wt% 2,6-dimethylphenol and from 2 to 10 wt% of 2,3,6-trimethylphenol. Although the blends exhibit useful properties over the entire range of composition, those exhibiting unexpectedly enhanced toughness and improved heat distortion under load and therefore more preferred are the blends comprising from 5-40 wt% of the aromatic carbonate polymer component and correspondingly from 95 to 60 wt% of the polyphenylene ether copolymer component.

The blends are useful as molding and extrusion resins, and because of their good molding characteristics and attractive high temperature properties will find extensive application for providing molded and extruded articles for use under severe high temperature conditions.

We claim:

1. In a thermoplastic blend comprising an aromatic carbonate polymer of a dihydric phenol and a polyphenylene ether resin, the improvement wherein the polyphenylene ether is a copolymer of from 98 to 80 wt% 2,6-dialkyl phenol and from 2 to 20 wt% 2,3,6-trialkylphenol.

2. The thermoplastic blend of claim 1 wherein the aromatic carbonate polymer is selected from the group consisting of a carbonate polymer of 2,2-bis(4-hydroxyphenyl)propane, a carbonate polymer of 2,2-bis(3,5-dimethyl-4-hydroxyphenyl)propane, and mixtures thereof.

3. A thermoplastic blend comprising from 5 to 95 wt% of an aromatic carbonate polymer selected from the group consisting of the carbonate polymer of 2,2-bis(3,5-dimethyl-4-hydroxyphenyl)propane, the carbonate polymer of 2,2-bis(4-hydroxyphenyl)propane and mixtures thereof, and correspondingly, from 95 to 5 wt% of a polyphenylene ether copolymer of from 98 to 80 wt% 2,6-dimethyl phenol and from 2 to 20 wt% 2,3,6-trimethyl phenol.

4. The blend of claim 3 comprising from 5 to 40 wt% of said carbonate polymer and correspondingly from 95 to 60 wt% of said polyphenylene ether copolymer.

5. The blend of claim 3 wherein said polyphenylene ether copolymer is a copolymer consisting of about 95 wt% 2,6-dimethylphenol and about 5 wt% 2,3,6-trimethylphenol.

6. A thermoplastic blend comprising from 5 to 40 wt% of an aromatic carbonate polymer selected from the group consisting of the carbonate polymer of 2,2-bis(3,5-dimethyl-4-hydroxyphenyl)propane, the carbonate polymer of 2,2-bis(4-hydroxyphenyl)propane and mixtures thereof, and correspondingly, from 95 to 60 wt% of a polyphenylene ether copolymer of about 95 wt% 2,6-dimethylphenol and about 5 wt% 2,3,6-trimethylphenol.

7. The blend of claim 6 wherein the aromatic carbonate polymer is the carbonate polymer of 2,2-bis(3,5-dimethyl-4-hydroxyphenyl)propane.

8. The blend of claim 6 wherein the aromatic carbonate copolymer is the carbonate polymer of 2,2-bis(4-hydroxyphenyl)propane.

* * * * *